(12) United States Patent
Puggelli et al.

(10) Patent No.: US 10,355,593 B1
(45) Date of Patent: Jul. 16, 2019

(54) CIRCUITS FOR THREE-LEVEL BUCK REGULATORS

(71) Applicant: Lion Semiconductor Inc., San Francisco, CA (US)

(72) Inventors: Alberto Puggelli, Burlingame, CA (US); Minbok Lee, Seoul (KR); Hans Meyvaert, Oakland, CA (US); Zhipeng Li, Fremont, CA (US)

(73) Assignee: Lion Semiconductor Inc., San Francisco, CA (US)

( * ) Notice: Subject to any disclaimer, the term of this patent is extended or adjusted under 35 U.S.C. 154(b) by 0 days.

(21) Appl. No.: 15/868,496

(22) Filed: Jan. 11, 2018

(51) Int. Cl.
   *H02M 3/158* (2006.01)
   *H02M 1/32* (2007.01)

(52) U.S. Cl.
   CPC .............. *H02M 3/158* (2013.01); *H02M 1/32* (2013.01)

(58) Field of Classification Search
   CPC .......... H02M 3/07; H02M 3/155; H02M 1/32; H02M 1/34; H02M 2001/342; H02M 2003/072; H02M 3/156; H02M 3/157; H02M 3/158; H02M 2001/344
   See application file for complete search history.

(56) References Cited

U.S. PATENT DOCUMENTS

| | | | | |
|---|---|---|---|---|
| 10,050,515 | B1 * | 8/2018 | Chakraborty | H02M 1/32 |
| 2008/0239772 | A1 * | 10/2008 | Oraw | H02M 3/07 |
| | | | | 363/60 |
| 2011/0018511 | A1 * | 1/2011 | Carpenter | H02M 3/158 |
| | | | | 323/282 |
| 2012/0069604 | A1 * | 3/2012 | Yagyu | H02M 1/34 |
| | | | | 363/20 |
| 2015/0009734 | A1 * | 1/2015 | Stahl | H02M 7/483 |
| | | | | 363/98 |
| 2016/0118886 | A1 * | 4/2016 | Zhang | H02M 3/158 |
| | | | | 323/271 |
| 2016/0315539 | A1 * | 10/2016 | Lee | H02M 3/158 |
| 2017/0126120 | A1 * | 5/2017 | Chakraborty | H02M 3/158 |
| 2018/0054121 | A1 * | 2/2018 | Chen | H02M 3/158 |

OTHER PUBLICATIONS

Kim et al., "A Fully-Integrated 3-Level DC-DC Converter for Nanosecond-Scale DVFS", in IEEE Journal of Solid-State Circuits, vol. 47, No. 1, Jan. 2012, pp. 1-14.

International Search Report and Written Opinion dated Feb. 22, 2019 in International Patent Application No. PCT/US2019/013226.

* cited by examiner

*Primary Examiner* — Gary L Laxton
*Assistant Examiner* — Ivan Laboy
(74) *Attorney, Agent, or Firm* — Byrne Poh LLP

(57) ABSTRACT

An inductor; a first switch having a first side connected to a first voltage source (VS1); a second switch having a first side connected to a second side of the first switch (2SS1), and a second side connected to a first side of the inductor (1SI); a third switch having a first side connected to the 1SI; a fourth switch having a first side connected to a second side of the third switch (2SS3), and a second side connected to a second voltage source (VS2); a fifth switch having a first side connected to the 1SI, and a second side connected to the VS1 and/or the VS2; a first capacitor having a first side connected to the 2SS1, and a second side connected to the 2SS3; and a second capacitor having a first side connected to a second side of the inductor, and a second side connected to the VS2.

2 Claims, 5 Drawing Sheets

State 0

State 1

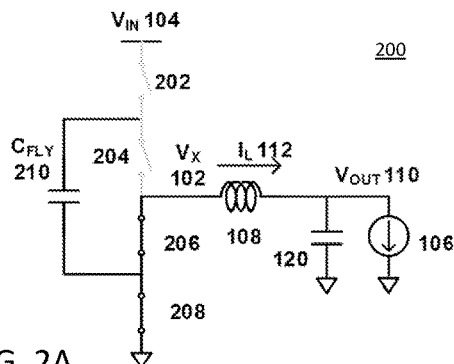
FIG. 2A
(PRIOR ART) State 0
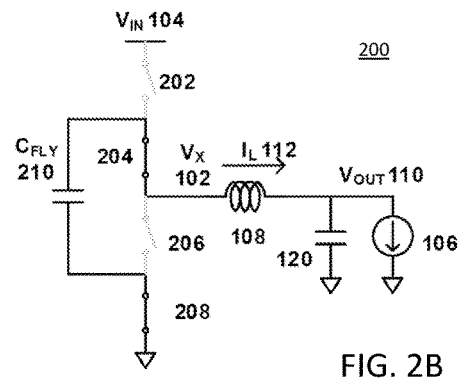
State 1 FIG. 2B
(PRIOR ART)
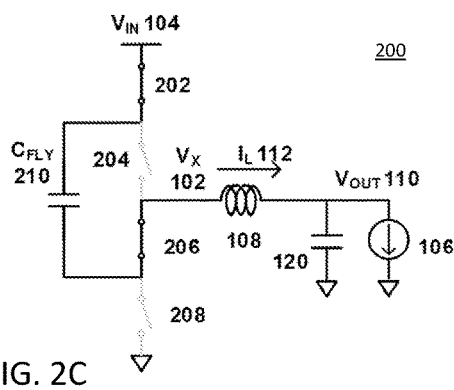
FIG. 2C
(PRIOR ART) State 2
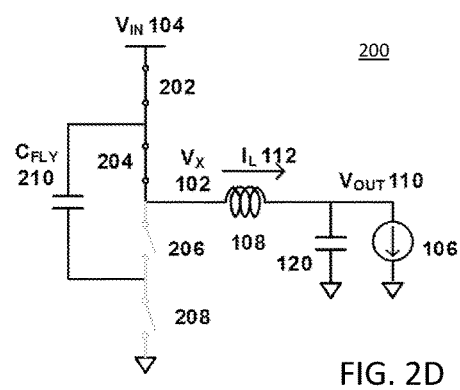
State 3 FIG. 2D
(PRIOR ART)
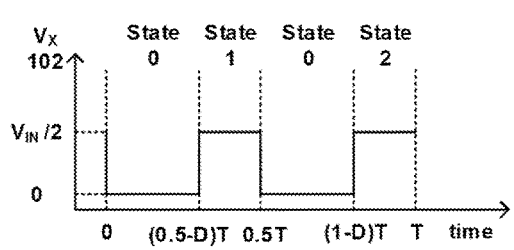
FIG. 2E If D < 0.5
(PRIOR ART)
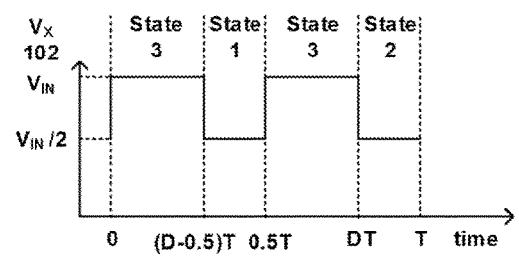
If D >= 0.5 FIG. 2F
(PRIOR ART)

State 1

State 2

State 3

If D >= 0.5

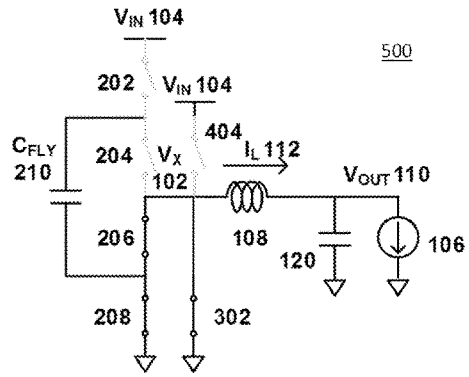
FIG. 5A  State 0
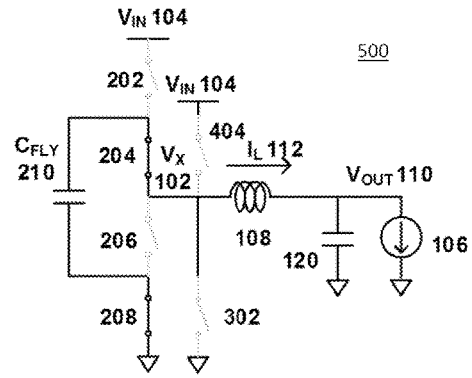
State 1  FIG. 5B
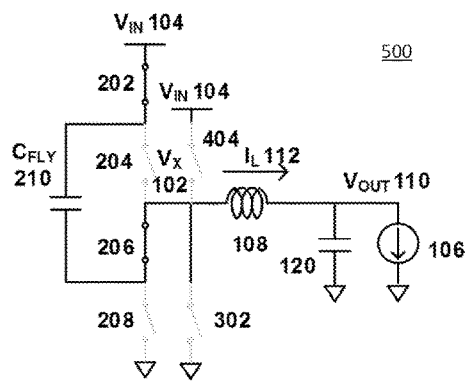
FIG. 5C  State 2
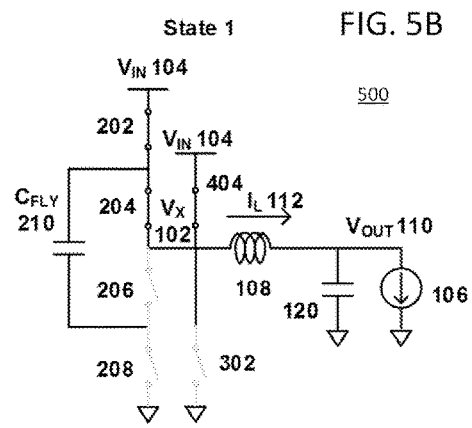
State 3  FIG. 5D
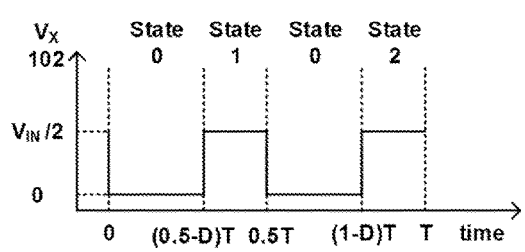
FIG. 5E   If D < 0.5
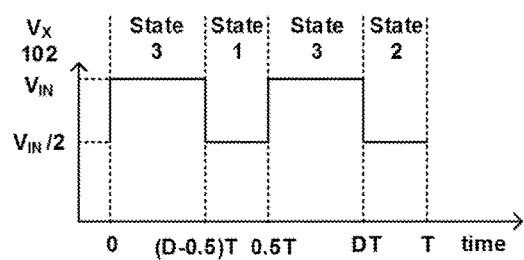
If D >= 0.5   FIG. 5F

US 10,355,593 B1

CIRCUITS FOR THREE-LEVEL BUCK REGULATORS

BACKGROUND

Voltage regulators are a ubiquitous circuit component that are critical to providing consistent power to circuit loads. Buck regulators form a class of voltage regulators that are popular in certain applications. However, buck regulators can suffer inefficiencies due to parasitic resistances in those regulators.

Accordingly, new circuits for voltage regulators are desirable.

SUMMARY

Circuits for three-level buck regulators are provided. In some embodiments, the circuits comprise: an inductor having a first side and having a second side; a first switch having a first side connected to a first voltage source and having a second side; a second switch having a first side connected to the second side of the first switch and having a second side connected to the first side of the inductor; a third switch having a first side connected to the first side of the inductor and having a second side; a fourth switch having a first side connected to the second side of the third switch and having a second side connected to a second voltage source; a fifth switch having a first side connected to the first side of the inductor and having a second side connected to one of the first voltage source and the second voltage source; a first capacitor having a first side connected to the second side of the first switch and having a second side connected to the second side of the third switch; and a second capacitor having a first side connected to the second side of the inductor and having a second side connected to the second voltage source.

In some embodiments, the second side of the fifth switch is connected to the second voltage source, and the circuits further comprise: a sixth switch have a first side connected to the first side of the inductor and having a second side connected to the first voltage source.

In some embodiments, the second side of the fifth switch is connected to the second voltage source and wherein in a State 0 of the regulator: the first switch is open; the second switch is open; the third switch closed; the fourth switch is closed; and the fifth switch is closed. In some such embodiments, in a State 1 of the regulator: the first switch is open; the second switch is closed; the third switch open; the fourth switch is closed; and the fifth switch is open. Further, in some such embodiments, in a State 2 of the regulator: the first switch is closed; the second switch is open; the third switch closed; the fourth switch is open; and the fifth switch is open. Still further, in some such embodiments, the regulator switches between State 0, State 1, and State 2 during a cycle of the regulator.

In some embodiments, the second side of the fifth switch is connected to the second voltage source and wherein in a State 3 of the regulator: the first switch is closed; the second switch is closed; the third switch open; the fourth switch is open; and the fifth switch is closed. In some such embodiments, in a State 1 of the regulator: the first switch is open; the second switch is closed; the third switch open; the fourth switch is closed; and the fifth switch is open. Further, in some such embodiments, in a State 2 of the regulator: the first switch is closed; the second switch is open; the third switch closed; the fourth switch is open; and the fifth switch is open. Still further, in some such embodiments, the regulator switches between State 3, State 1, and State 2 during a cycle of the regulator.

In some embodiments, the second side of the inductor is coupled to a load.

BRIEF DESCRIPTION OF THE DRAWINGS

FIGS. 2A-2F illustrate an example of a 3-level buck regulator and its operation as known in the prior art.

FIGS. 5A-5F illustrate an example of a 3-level buck regulator, including a switch to ground and a switch to $V_{IN}$ to reduce parasitic resistance, and its operation in accordance with some embodiments.

DETAILED DESCRIPTION

Figure 1A:
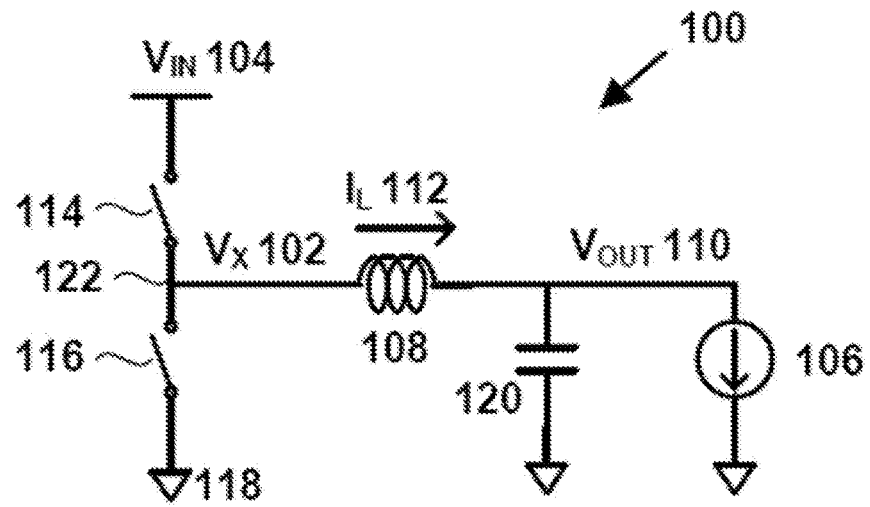
FIGS. 1A-1B illustrate an example of a buck regulator and its operation as known in the prior art.
Figure 1B:
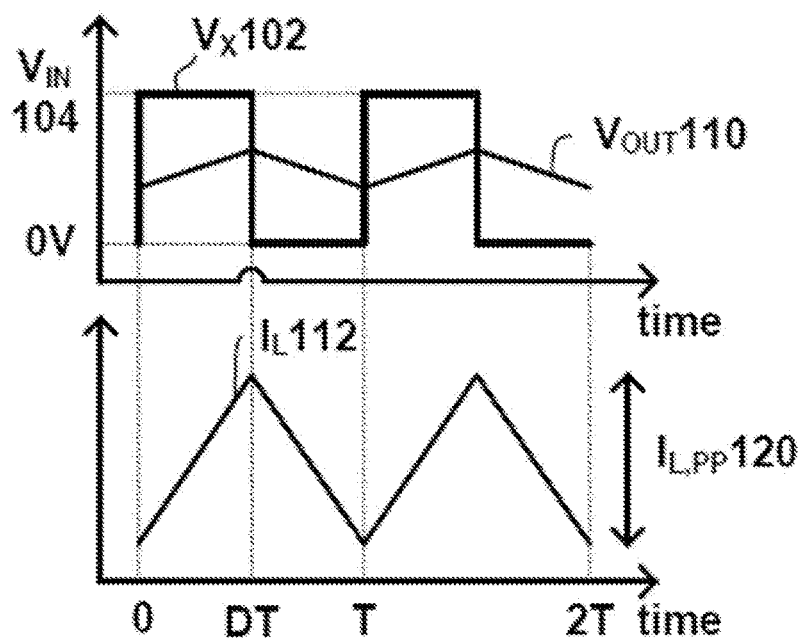

FIGS. 1A-1B illustrate an example 100 of a buck regulator and its operation as known in the prior art. As shown in FIG. 1A, buck regulator 100 includes an inductor 108, two switches 114 and 116, and a capacitor 120. The buck regulator drives a load 106.

During operation, buck regulator 100 connects inductor 108 to a first voltage source $V_{IN}$ 104 and a second voltage source 118 through switches 114 and 116. In some cases, second voltage source 118 is a ground voltage (0V) source, which presumed for the remained of this application for simplicity only. Switches 114 and 116 are turned ON and OFF using control signals from any suitable control mechanism such as a hardware processor. Switches 114 and 116 are controlled so that the two switches are not turned ON at the same time. Switches 114 and 116 can be implemented as transistors, such as MOSFET transistors. For example, switch 114 can be implemented using a P-channel MOSFET transistor and switch 116 can be implemented using an N-channel MOSFET transistor.

As illustrated in FIG. 1B, as switches 114 and 116 turn ON and OFF with a period T, voltage $V_X$ 102 at the left side (input) of inductor 108 swings between 0V (ground) and $V_{IN}$ with a period T. More particularly, between time 0 and time DT and between time T and time T+DT, switch 114 is closed and switch 116 is open. This results in $V_X$ 102 being equal to $V_{IN}$ 104. Between time DT and time T and between time T+DT and time 2T, switch 114 is open and switch 116 is closed. This results in $V_X$ 102 being equal to ground. Inductor 108 and capacitor 120 operate as a low-pass filter that averages $V_X$ 102 over time, thereby creating a signal $V_{OUT}$ 110 at the output of the regulator that has a small voltage ripple. The level of voltage output by $V_{OUT}$ 110 can depend on the amount of time the inductor 108 is coupled to the first voltage source $V_{IN}$ 104 and the amount of time the inductor 108 is coupled to the second voltage source 118. For example, buck regulator 100 can adjust the level of $V_{OUT}$ 110 so that it is equal to $V_{IN}D+(0V)(1-D)$, where D, a number between 0 and 1, is the portion of time $V_X$ is coupled to $V_{IN}$. D is also referred to as a duty cycle. Output load 106 that consumes the output current can be any type of an electronic device, including hardware processors, memory (DRAM, NAND, flash, etc.), RF chips, WiFi combo chips, and power amplifiers.

The efficiency of buck regulator 100 can be computed as:

$$\eta = \frac{P_L}{P_I}$$

where $P_L$ indicates the power delivered to output load 106 and $P_I$ indicates the input power to buck regulator 108. $P_L$ can be computed as follows: $P_L=P_I-P_{LOSS}$, where $P_{LOSS}$ includes the amount of power losses during the voltage regulation process.

One of the major power losses $P_{LOSS}$ associated with buck regulator 100 includes a resistive loss $P_R$ incurred by the parasitic resistance of inductor 108. When buck regulator 100 delivers power to output load 106 by providing current $I_L$ 112, ideally, buck regulator 100 provides all of the power that it receives at the input (input power) to the output load 106 as output power. However, in a practical scenario, buck regulator 100 dissipates some of its input power internally at inductor 108. Ideally, an inductor 108 has zero resistance. Therefore, a current through inductor 108 would not dissipate any power. However, in a practical scenario, inductor 108 is associated with a finite resistance, primarily due to the resistance of the material forming inductor 108. This undesirable, finite resistance of inductor 108 is referred to as a parasitic resistance. The parasitic resistance can incur a resistive power loss since the parasitic resistance can cause the current through inductor 108 to dissipate energy. Therefore, the resistive power loss can reduce the power conversion efficiency of buck regulator 100.

When the current is alternating, then the resistive power loss can be computed as $P_R=I_{L,RMS}^2R_L$, where $R_L$ is the value of the parasitic resistance of inductor 108, and $I_{L,RMS}$ is the root-mean square of the current through inductor 108. $I_{L,RMS}$ can be reduced by reducing the peak-to-peak ripple of the inductor current ($I_{L,PP}$ 120). Therefore, buck regulator 100 can reduce the resistive loss $P_R$ by reducing the peak-to-peak ripple of the inductor current $I_{L,PP}$ 120.

There are two ways to reduce the peak-to-peak ripple of the inductor current $I_{L,PP}$ 120. First, buck regulator 100 can switch at a high frequency and reduce the period of the switching regulator T. However, this solution can increase the power consumed to charge and discharge the parasitic capacitance at junction 122 between switches 114 and 116. This capacitive power loss can be significant because the size of switches 114 and 116 can be large, which increases the parasitic capacitance, and because the voltage swing on $V_X$ 102 is large. This capacitive power loss can be computed as follows: $P_C=fCV^2$, where C is the amount of the parasitic capacitance at junction 122, f is the frequency at which the buck regulator 100 switches, and V is the voltage swing at the junction 122. This power loss can be significant because the size of switches 114 and 116 is large, which increases the parasitic capacitance, and because the voltage swing on $V_X$ 102 is large.

Second, the buck regulator 100 can use an inductor 108 with a high inductance value, thereby reducing the parasitic resistance $R_L$. However, this approach makes the inductor 108 large and makes integration difficult.

FIGS. 2A-2F illustrate an example 200 of a 3-level buck regulator and its operation as known in the prior art. At a high level, regulator 200 is a 2:1 Switched Capacitor regulator followed by an inductor. As described in connection with FIGS. 1A-1B, a buck regulator has a square wave on $V_X$ 102 that swings between 0 and $V_{IN}$ 104, which is two levels of voltages. A 3-level buck regulator, however, can have 0, $V_{IN}/2$ or $V_{IN}/2$ at $V_X$ 102, hence the name "3" level buck regulator.

As shown in FIG. 2E, when duty cycle "D" is smaller than 0.5, $V_X$ 102 swings between 0 and $V_{IN}/2$ to regulate $V_{OUT}$ 110 to be a value between 0 and $V_{IN}/2$. More particularly, as shown in FIG. 2E, between time 0 and time (0.5−D)T and between time 0.5T and time (1−D)T, regulator 200 operates in State 0 shown in FIG. 2A. In this state, switches 202 and 204 are open and switches 206 and 208 are closed. Between time (0.5−D)T and time 0.5T, regulator 200 operates in State 1 shown in FIG. 2B. In this state, switches 202 and 207 are open and switches 204 and 208 are closed. Between time (1−D)T and time T, regulator 200 operates in State 2 shown in FIG. 2C. In this state, switches 204 and 208 are open and switches 202 and 206 are closed.

As shown in FIG. 2F, when D is equal to or larger than 0.5, $V_X$ 102 swings between $V_{IN}/2$ and $V_{IN}$ 104 to regulate $V_{OUT}$ 110 to be a value between $V_{IN}/2$ and $V_{IN}$. More particularly, as shown in FIG. 2F, between time 0 and time (D−0.5)T and between time 0.5T and time DT, regulator 200 operates in State 3 shown in FIG. 2D. In this state, switches 206 and 208 are open and switches 202 and 204 are closed. Between time (D−0.5)T and time 0.5T, regulator 200 operates in State 1 shown in FIG. 2B. In this state, switches 202 and 207 are open and switches 204 and 208 are closed. Between time DT and time T, regulator 200 operates in State 2 shown in FIG. 2C. In this state, switches 204 and 208 are open and switches 202 and 206 are closed.

Irrespective of the value of D between 0 and 1, the voltage swing on $V_X$ 102 is $V_{IN}/2$, which is half of the $V_{IN}$ swing on $V_X$ for a 2-level buck regulator, like shown in FIGS. 1A-1B. Since the voltage swing on $V_X$ is half, the peak to peak inductor current ripple $I_L$ 112 is also half. As a result, a 3-level buck regulator can have smaller $I_{L,RMS}^2$ loss on the inductor, or can use a smaller inductance value than a buck regulator for the same $I_{L,RMS}^2$ loss.

The 3-level buck regulator generates the third level $V_{IN}/2$ using $C_{FLY}$ 210. State 1 and 2 are the same as a typical 2:1 SC regulator, so iterating between these two states generates $V_{IN}/2$ on $V_X$.

One drawback of a 3-level buck regulator is that switches (e.g., switches 206 and 208 in FIG. 2A, and switches 202 and 204 in FIG. 2D) are cascoded in series, which results in larger $I^2R$ loss due to the parasitic resistance on the switches. In State 0, switches 206 and 208 are turned ON in series, while in State 3, switches 202 and 204 are turned ON in series.

Figure 3A:
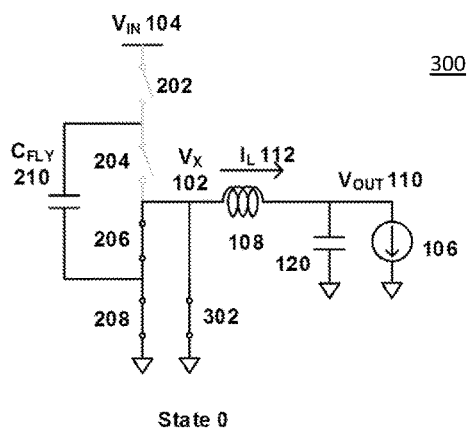
FIGS. 3A-3D illustrate an example of a 3-level buck regulator, including a switch to ground to reduce parasitic resistance, and its operation in accordance with some embodiments.
Figure 3B:
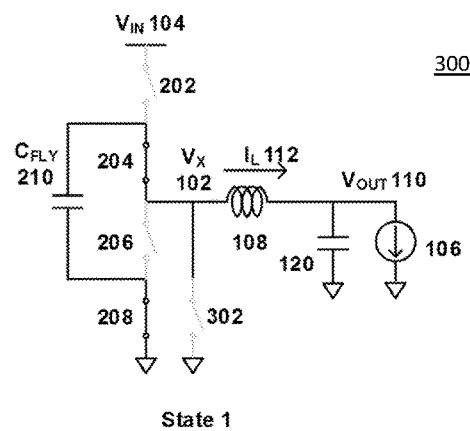
Figure 3C:
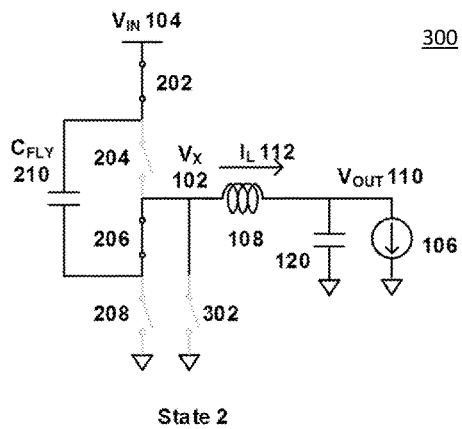
Figure 3D:
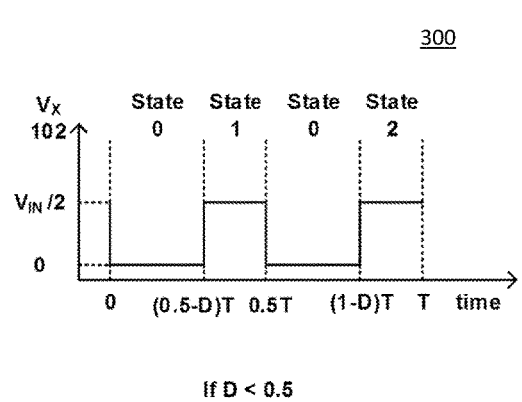

In accordance with some embodiments, FIGS. 3A-3D illustrate an example 300 of a 3-level buck regulator that adds a switch between ground (0V) (or any other suitable second voltage source) and $V_X$ 102 to reduce the resistance of switches 206 and 208 when cascoded as shown in FIG. 3A. More particularly, as shown in FIGS. 3A and 3D, when D is lower than 0.5, a switch 302 can be used to reduce the parasitic resistance between ground and $V_X$ 102 in State 0. Switch 302 is used only when D is smaller than 0.5 and regulator 300 is in State 0. 3-level buck regulator 300 can work when D is greater than or equal to 0.5 (which would operate like regulator 200 as shown in FIGS. 2B, 2C, 2D, and 2F), but switch 302 will always be OFF and not provide any benefit compared to a typical 3-level buck regulator like the one in FIGS. 2A-2F.

Figure 4A:
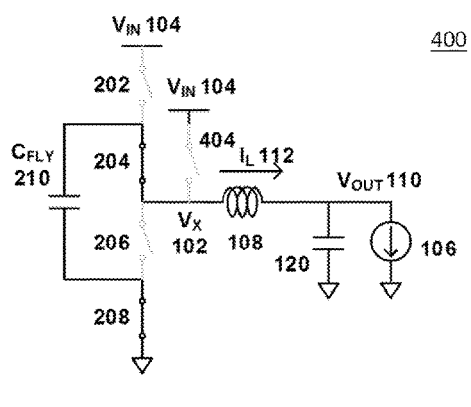
FIGS. 4A-4D illustrate an example of a 3-level buck regulator, including a switch to $V_{IN}$ to reduce parasitic resistance, and its operation in accordance with some embodiments.
Figure 4B:
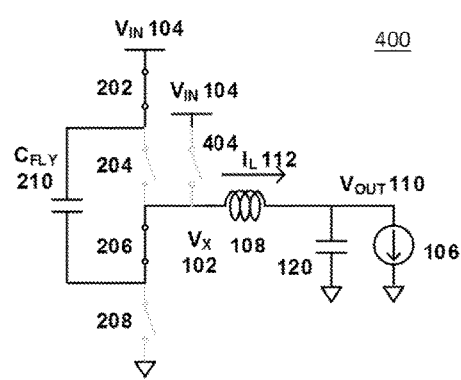
Figure 4C:
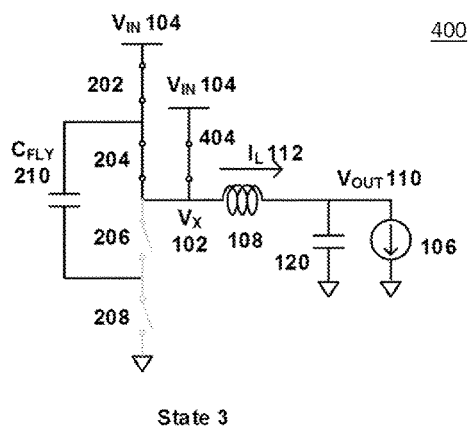
Figure 4D:
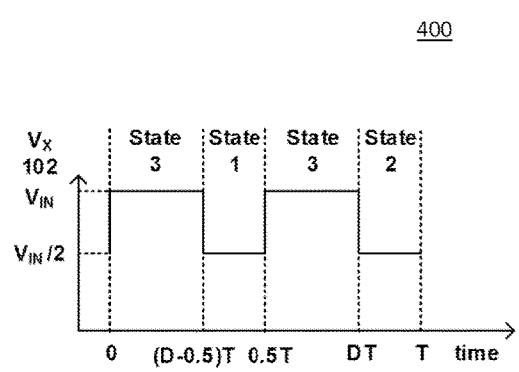

In accordance with some embodiments, FIGS. 4A-4D illustrate an example 400 of a 3-level buck regulator that adds a switch between $V_X$ 102 and $V_{IN}$ 104 to reduce the resistance of switches 202 and 204 when cascoded as shown in FIG. 4C. More particularly, as shown in FIGS. 4C and 4D, when D is greater than or equal to 0.5, a switch 404 can be used to reduce the parasitic resistance between $V_X$ 102 and $V_{IN}$ 104 in State 3. Switch 404 is used only when D is greater than or equal to 0.5 and regulator 400 is in State 3. 3-level buck regulator 400 can work when D is less than 0.5 (which would operate like regulator 200 as shown in FIGS. 2A, 2B, 2C, and 2E), but switch 404 will always be OFF and not provide any benefit compared to a typical 3-level buck regulator like the one in FIGS. 2A-2F.

In accordance with some embodiments, FIGS. 5A-5F illustrate an example 500 of a 3-level buck regulator that adds a switch between ground (0V) (or any other suitable second voltage source) and $V_X$ 102 to reduce the resistance of switches 206 and 208 when cascoded as shown in FIG. 5A and that adds a switch between $V_X$ 102 and $V_{IN}$ 104 to reduce the resistance of switches 202 and 204 when cascoded as shown in FIG. 5D. More particularly, as shown in FIGS. 5A and 5E, when D is lower than 0.5, a switch 302 can be used to reduce the parasitic resistance between ground and $V_X$ 102 in State 0. Switch 302 is used only when D is smaller than 0.5 and regulator 500 is in State 0. As shown in FIGS. 5D and 5F, when D is greater than or equal to 0.5, a switch 404 can be used to reduce the parasitic resistance between $V_X$ 102 and $V_{IN}$ 104 in State 3. Switch 404 is used only when D is greater than or equal to 0.5 and regulator 500 is in State 3. When regulator 500 is in either State 1 or State 2, both switches 302 and 404 are OFF.

In some embodiments, switches 302 and 404 can be rated at $V_{IN}/2$ since the maximum voltage across the switch is $V_{IN}/2$. This is better than using a switch rated at $V_{IN}$ 104 since switch size and resistance grow larger as voltage rate increases.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A circuit for a three-level buck regulator, comprising:
an inductor having a first side and having a second side, wherein during operation, current only flows through the inductor from the first side of the inductor to the second side of the inductor;
a first switch having a first side connected to an input voltage source and having a second side;
a second switch having a first side connected to the second side of the first switch and having a second side connected to the first side of the inductor;
a third switch having a first side connected to the first side of the inductor and having a second side;
a fourth switch having a first side connected to the second side of the third switch and having a second side connected to a second voltage source;
a fifth switch having a first side connected to the first side of the inductor and having a second side connected to the second voltage source;
a sixth switch have a first side connected to the first side of the inductor and having a second side connected to the input voltage source;
a first capacitor having a first side connected to the second side of the first switch and having a second side connected to the second side of the third switch; and
a second capacitor having a first side connected to the second side of the inductor and having a second side connected to the second voltage source,
wherein in a State 0 of the regulator:
the first switch is open;
the second switch is open;
the third switch closed;
the fourth switch is closed;
the fifth switch is closed; and
the sixth switch is open,
wherein in a State 1 of the regulator:
the first switch is open;
the second switch is closed;
the third switch open;
the fourth switch is closed;
the fifth switch is open; and
the sixth switch is open,
wherein in a State 2 of the regulator:
the first switch is closed;
the second switch is open;
the third switch closed;
the fourth switch is open;
the fifth switch is open; and
the sixth switch is open,
wherein in a State 3 of the regulator:
the first switch is closed;
the second switch is closed;
the third switch open;
the fourth switch is open;
the fifth switch is open; and
the sixth switch is closed,
wherein the regulator switches between State 0, State 1, and State 2 during a cycle of the regulator when a duty cycle of the regulator is less than 50%, and
wherein the regulator switches between State 3, State 1, and State 2 during a cycle of the regulator when the duty cycle of the regulator is greater than 50%.

2. The circuit of claim 1, wherein the second side of the inductor is coupled to a load.

* * * * *